(12) United States Patent
Maruyama

(10) Patent No.: US 11,648,870 B2
(45) Date of Patent: May 16, 2023

(54) VEHICLE HEADLAMP

(71) Applicant: KOITO MANUFACTURING CO., LTD., Tokyo (JP)

(72) Inventor: Yuta Maruyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/802,180

(22) PCT Filed: Feb. 18, 2021

(86) PCT No.: PCT/JP2021/006165
§ 371 (c)(1),
(2) Date: Aug. 25, 2022

(87) PCT Pub. No.: WO2021/172169
PCT Pub. Date: Sep. 2, 2021

(65) Prior Publication Data
US 2023/0084809 A1  Mar. 16, 2023

(30) Foreign Application Priority Data
Feb. 26, 2020  (JP) .............................. JP2020-030466

(51) Int. Cl.
*B60Q 1/14* (2006.01)
*B60Q 1/08* (2006.01)

(52) U.S. Cl.
CPC .............. *B60Q 1/143* (2013.01); *B60Q 1/08* (2013.01); *B60Q 2300/056* (2013.01); *B60Q 2300/42* (2013.01)

(58) Field of Classification Search
CPC .... B60Q 1/08; B60Q 1/143; B60Q 2300/056; B60Q 2300/42
See application file for complete search history.

(56) References Cited

U.S. PATENT DOCUMENTS

| 2014/0355280 A1 | 12/2014 | Fujiyoshi |
| 2015/0009693 A1 | 1/2015 | Sekiguchi et al. |
| 2016/0250964 A1 | 9/2016 | Takagaki et al. |

FOREIGN PATENT DOCUMENTS

| EP | 2 281 719 A1 | 2/2011 |
| EP | 2 786 898 A1 | 10/2014 |
| EP | 2 821 282 A2 | 1/2015 |

(Continued)

OTHER PUBLICATIONS

International Search Report issued for PCT/JP2021/006165 dated Apr. 20, 2021.

*Primary Examiner* — Thomas M Sember
(74) *Attorney, Agent, or Firm* — Sughrue Mion, PLLC

(57) ABSTRACT

A vehicle headlamp (1) includes a lamp fitting (10), and a control unit (CO) configured to, when a signal indicating detection of a preceding vehicle (80) is input, control the lamp fitting (10) such that a total luminous flux amount of light emitted to a first region (211) and a second region (212), and widths (W211 and W212) in the first region (211) and the second region (212) change according to a position of the preceding vehicle (80) with respect to a vehicle (100), in which the first region (211) overlaps a whole of a visual recognition unit of the preceding vehicle (80), and edges (212R and 212L) of the second region (212) on both sides in the left-right direction are located on a preceding vehicle (80) side with respect to edges (211R and 211L) of the first region (211) on both sides in the left-right direction.

4 Claims, 7 Drawing Sheets

(56) References Cited

FOREIGN PATENT DOCUMENTS

| | | |
|---|---|---|
| EP | 3 061 653 A1 | 8/2016 |
| JP | 2010-118274 A | 5/2010 |
| JP | 2011-031807 A | 2/2011 |
| JP | 2015-015104 A | 1/2015 |
| JP | 2016-159709 A | 9/2016 |
| WO | 2013/080363 A1 | 6/2013 |

VEHICLE HEADLAMP

CROSS REFERENCE TO RELATED APPLICATIONS

This application is a National Stage of International Application No. PCT/JP2021/006165 filed Feb. 18, 2021, claiming priority based on Japanese Patent Application No. 2020-030466 filed Feb. 26, 2020.

TECHNICAL FIELD

The present invention relates to a vehicle headlamp.

BACKGROUND ART

Conventionally, a vehicle headlamp that changes a light distribution pattern of emitted light on the basis of information from a detection device that detects another vehicle located in front of a vehicle is known. Such a vehicle headlamp is described in Patent Literature 1 described below.

A vehicle headlamp described in Patent Literature 1 described below includes a lamp fitting capable of changing a light distribution pattern of emitted light, a detection device that detects another vehicle located in front of a vehicle, and a control unit that controls an irradiation range of the lamp fitting such that light is emitted to surroundings of the other vehicle while suppressing emission of light to the other vehicle. Patent Literature 1 described below describes that the control unit controls the lamp fitting such that a width in a left-right direction of a region where light irradiation is suppressed changes according to a position of the other vehicle in the left-right direction. With the vehicle headlamp described in Patent Literature 1 described below, it is possible to secure an appropriate gap between the other vehicle and the irradiation range according to the position of the other vehicle with respect to the vehicle, and it is possible to suppress dazzling of an occupant of the other vehicle. Note that, in Patent Literature 1 described below, the width in the left-right direction of the region where light irradiation is suppressed is substantially constant in an up-down direction.
[Patent Literature 1] JP 2011-31807 A

SUMMARY OF INVENTION

In such a vehicle headlamp, since the total luminous flux amount of light from the lamp fitting is reduced and a predetermined region overlapping another vehicle is formed, the visibility of the front tends to decrease, and there is a demand for improving the visibility of the front. In response to this demand, it is conceivable to reduce a predetermined region where the total luminous flux amount of the light from the lamp fitting is reduced. However, when the predetermined region is simply reduced, dazzling of an occupant of the other vehicle easily occurs.

Therefore, an object of the present invention is to provide a vehicle headlamp capable of improving the visibility of the front while suppressing dazzling of an occupant of another vehicle.

In order to achieve the above object, a vehicle headlamp of the present invention includes: a lamp fitting configured to be capable of changing a light distribution pattern of emitted light; and a control unit configured to, when a signal indicating detection of another vehicle located in front of a vehicle is input from a detection device, control the lamp fitting such that a total luminous flux amount of light emitted from the lamp fitting to a first region that crosses at least a part of the other vehicle in a left-right direction and a second region that is connected to a lower side of the first region and extends in the left-right direction in the light distribution pattern decreases, and widths in the left-right direction in the first region and the second region change according to a position of the other vehicle with respect to the vehicle, in which the first region overlaps a whole of a visual recognition unit with which a driver of the other vehicle visually recognizes outside of the vehicle, and edges of the second region on both sides in the left-right direction are located on a center side of the other vehicle with respect to edges of the first region on both sides in the left-right direction.

In the vehicle headlamp, the widths in the left-right direction of the first regions and the second regions in which the total luminous flux amount of light from the lamp fitting is reduced are changed according to the position of the other vehicle with respect to the vehicle. Therefore, with the vehicle headlamp, it is possible to secure an appropriate gap between the other vehicle and the region where the total luminous flux amount of light from the lamp fitting is not reduced according to the position of the other vehicle with respect to the vehicle, and it is possible to suppress dazzling of an occupant of the other vehicle. In addition, in the vehicle headlamp, the first region overlaps the whole of the visual recognition unit with which the driver of the other vehicle visually recognizes the outside of the vehicle, and the width in the left-right direction of the second region connected to the lower side of the first region and extending in the left-right direction is smaller than that of the first region. Therefore, with the vehicle headlamp, as compared with a case where the width in the left-right direction of the region in which the total luminous flux amount of light from the lamp fitting is reduced is the same as the width in the left-right direction of the second region and is constant in the up-down direction, an appropriate gap can be secured between the visual recognition unit with which the driver of the other vehicle visually recognizes the outside of the vehicle and the region in which the total luminous flux amount of light from the lamp fitting is not reduced by the first region, and dazzling of an occupant of the other vehicle can be suppressed. In addition, with the vehicle headlamp, as compared with a case where the width in the left-right direction of the region in which the total luminous flux amount of light from the lamp fitting is reduced is the same as the width in the left-right direction of the first region and is constant in the up-down direction, a gap between the other vehicle and the region in which the total luminous flux amount of light from the lamp fitting is not reduced can be reduced below the visual recognition unit of the other vehicle, and the visibility of the front can be improved. Note that the visual recognition unit with which the driver of the other vehicle visually recognizes the outside of the vehicle is, for example, a front window in a case where the other vehicle is an oncoming vehicle, and is, for example, a side mirror, a rear window, an imaging device that images the rear of the vehicle, or the like in a case where the other vehicle is a preceding vehicle.

When the other vehicle is an oncoming vehicle, a width from an edge on a side opposite to a driving lane side of the vehicle in the left-right direction in the first region to the other vehicle may be larger than a width from an edge on the driving lane side of the vehicle in the left-right direction in the first region to the other vehicle.

In this case, for example, in a country or a region where the vehicle travels on the left side, the gap between the right edge the first region and the oncoming vehicle as viewed from the driver of the vehicle is larger than the gap between the left edge of the first region and the oncoming vehicle. Here, an angle formed by a traveling direction of the vehicle and a direction from the vehicle toward the oncoming vehicle increases as the oncoming vehicle approaches the vehicle, and in the country or the region described above, the oncoming vehicle moves in the right direction in the field of view of the driver of the vehicle. Therefore, with the above configuration, dazzling of the occupant of the oncoming vehicle can be appropriately suppressed as compared with the case where the gap between the left edge of the first region and the oncoming vehicle is the same as the gap between the right edge of the first region and the oncoming vehicle.

When the other vehicle is a preceding vehicle, a width from an edge on an oncoming lane side in the left-right direction in the first region to the other vehicle may be smaller than a width from an edge on a side opposite to the oncoming lane side in the left-right direction in the first region to the other vehicle.

In this case, for example, in the country or the region described above, the gap between the right edge of the first region and the preceding vehicle as viewed from the driver of the vehicle is smaller than the gap between the left edge of the first region and the preceding vehicle. Therefore, as compared with a case where the gap between the right edge of the first region and the preceding vehicle is the same as the gap between the left edge of the first region and the preceding vehicle, the visibility of the region on the right side of the preceding vehicle can be improved. Therefore, with this vehicle headlamp, for example, a pedestrian or the like in the vicinity of the center line or in the vicinity of a lane boundary line on the oncoming lane side can be easily visually recognized.

Alternatively, when the other vehicle is a preceding vehicle, a width from an edge on a side opposite to an oncoming lane side in the left-right direction in the first region to the other vehicle may be smaller than a width from an edge on the oncoming lane side in the left-right direction in the first region to the other vehicle.

In this case, for example, in the country or the region described above, the gap between the left edge of the first region and the preceding vehicle as viewed from the driver of the vehicle is smaller than the gap between the right edge of the first region and the preceding vehicle. Therefore, as compared with a case where the gap between the left edge of the first region and the preceding vehicle is the same as the gap between the right edge of the first region and the preceding vehicle, the visibility of the region on the left side of the preceding vehicle can be improved, and the visibility of a sign or the like provided on the sidewalk or the like can be improved.

As described above, according to the present invention, it is possible to provide a vehicle headlamp capable of improving the visibility of the front while suppressing dazzling of an occupant of another vehicle.

DESCRIPTION OF EMBODIMENTS

Aspects for carrying out the vehicle headlamp according to the present invention will be illustrated below together with the accompanying drawings. The embodiments illustrated below are for facilitating the understanding of the present invention, and are not for limiting the interpretation of the present invention. The present invention can be changed or modified from the embodiment below without departing from the spirit. In addition, in the accompanying drawings described above, the dimensions of each member may be exaggerated for ease of understanding.

Figure 1:
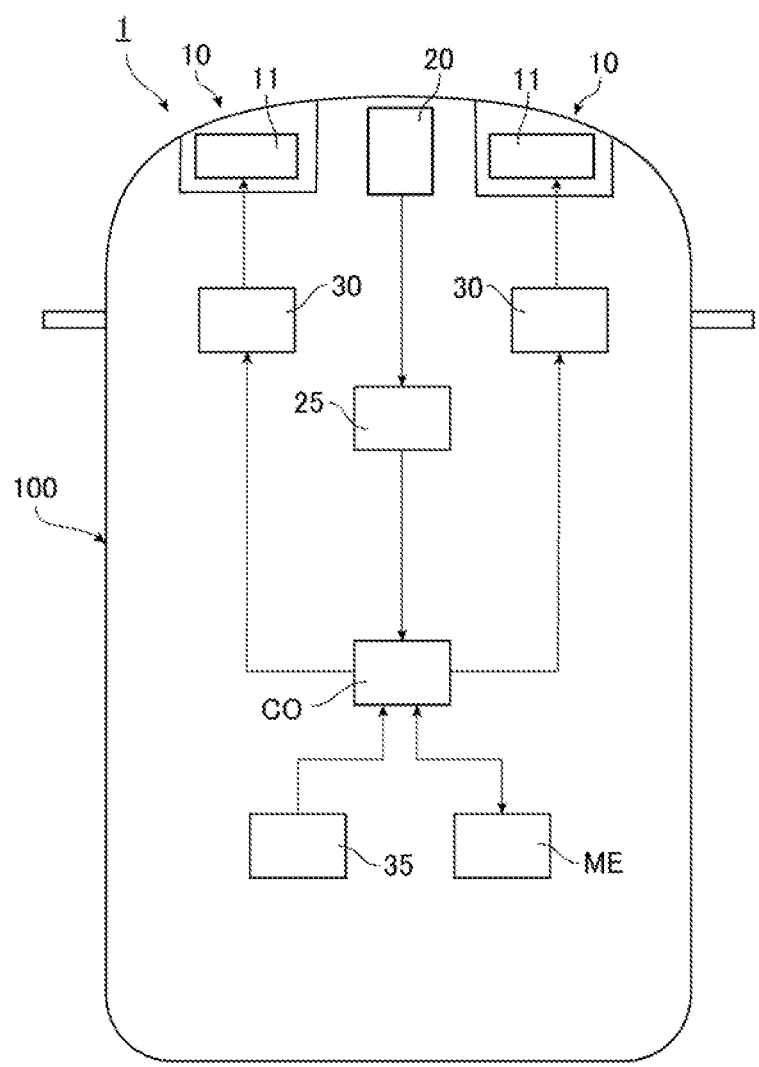
FIG. 1 is a plan diagram conceptually illustrating a vehicle including a vehicle headlamp according to an embodiment of the present invention.

FIG. 1 is a plan diagram conceptually illustrating a vehicle including a vehicle headlamp according to the present embodiment. As illustrated in FIG. 1, a vehicle headlamp 1 of the present embodiment is a headlamp for an automobile, and includes, as main configurations, a pair of left and right lamp fittings 10, a control unit CO, a detection device 20, a determination unit 25, a pair of power supply circuits 30, and memory ME. Note that, in the present specification, "right" means the right side from the viewpoint of the driver of a vehicle 100, and "left" means the left side from the viewpoint of the driver of the vehicle 100.

In the present embodiment, the pair of lamp fittings 10 has substantially symmetrical shapes in the left-right direction of the vehicle 100, and is configured to be able to change a light distribution pattern of emitted light. In addition, the configuration of one lamp fitting 10 is the same as the configuration of the other lamp fitting 10 except that the shape is substantially symmetrical. Therefore, the one lamp fitting 10 will be described below, and the description of the other lamp fitting 10 will be omitted.

Figure 2:
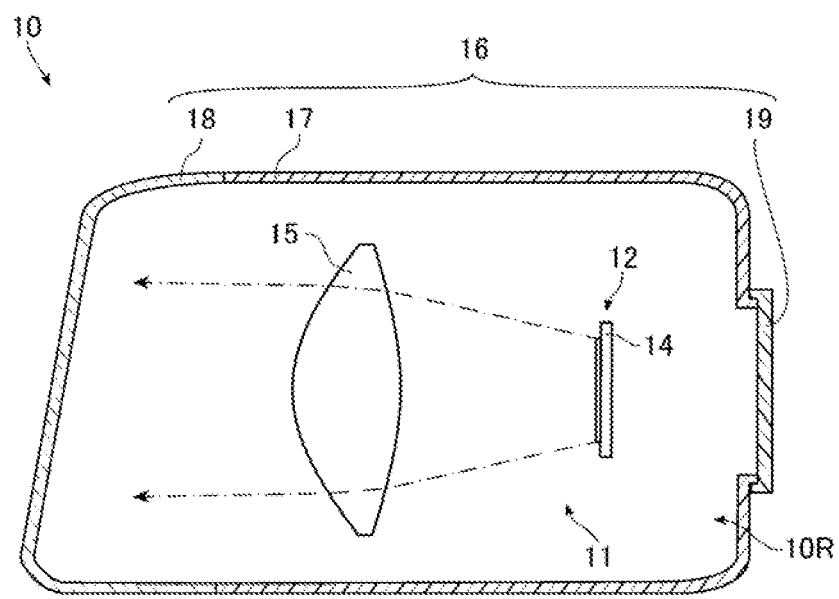
FIG. 2 is a side diagram schematically illustrating one lamp fitting illustrated in FIG. 1.

FIG. 2 is a side diagram schematically illustrating one lamp fitting 10 illustrated in FIG. 1. As illustrated in FIG. 2, the lamp fitting 10 includes, as main configurations, a lamp fitting unit 11 and an enclosure 16. Note that, in FIG. 2, the enclosure 16 is illustrated in a vertical cross section.

The enclosure 16 includes, as main configurations, a lamp housing 17, a front cover 18, and a back cover 19. The front of the lamp housing 17 is opened, and the front cover 18 is fixed to the lamp housing 17 so as to close the opening. In addition, an opening smaller than that in the front is formed in a rear of the lamp housing 17, and the back cover 19 is fixed to the lamp housing 17 so as to close the opening.

A space formed by the lamp housing 17, the front cover 18 closing the front opening of the lamp housing 17, and the back cover 19 closing the rear opening of the lamp housing 17 is a lighting chamber 10R, and the lamp fitting unit 11 is accommodated in the lighting chamber 10R. The lamp fitting unit 11 includes, as main configurations, a light distribution pattern forming unit 12 and a projection lens 15.

Figure 3:
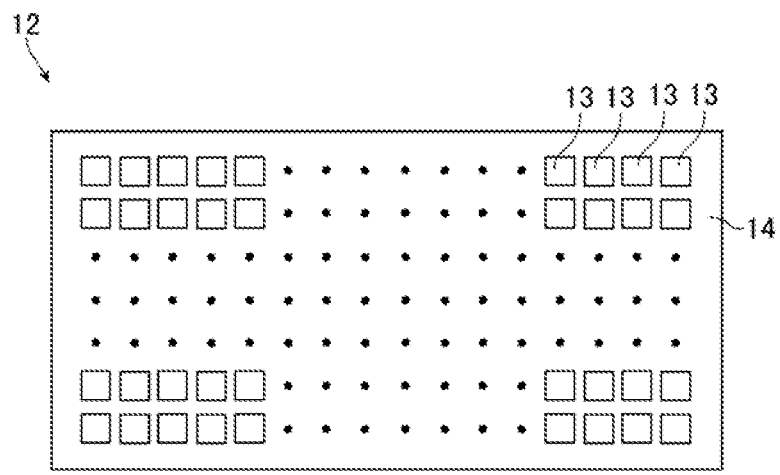
FIG. 3 is a front diagram schematically illustrating a light distribution pattern forming unit illustrated in FIG. 2.

FIG. 3 is a front diagram schematically illustrating the light distribution pattern forming unit 12 illustrated in FIG. 2. As illustrated in FIGS. 2 and 3, the light distribution pattern forming unit 12 of the present embodiment includes a plurality of light emitting elements 13 that emits light and a circuit board 14 on which the plurality of light emitting elements 13 is mounted. The plurality of light emitting elements 13 is arranged in a matrix form to form rows in an up-down direction and in a left-right direction, and emits light forward. In the present embodiment, these light emitting elements 13 are light emitting diodes (LEDs), and the light distribution pattern forming unit 12 is a so-called LED array. Note that the number of the light emitting elements 13, the number of rows of the light emitting elements 13, the number of the light emitting elements 13 in each row of the light emitting elements 13, the direction in which the light emitting elements 13 are arranged, and the type of the light emitting elements 13 are not particularly limited.

Such a light distribution pattern forming unit 12 can form a predetermined light distribution pattern by selecting the light emitting element 13 that emits light. In addition, the light distribution pattern forming unit 12 can adjust the intensity distribution of light in the predetermined light distribution pattern by adjusting the intensity of the light emitted from each light emitting element 13.

The projection lens 15 is a lens that adjusts a divergence angle of incident light. The projection lens 15 is arranged in front of the light distribution pattern forming unit 12, light emitted from the light distribution pattern forming unit 12 is incident on the projection lens 15, and the divergence angle of the light is adjusted by the projection lens 15. In the present embodiment, the projection lens 15 is a lens in which the incident surface and the emission surface are formed in a convex shape, and the rear focal point of the projection lens 15 is located on or near the light emission surface of any one of the light emitting elements 13 in the light distribution pattern forming unit 12. The divergence angle of light emitted from the light distribution pattern forming unit 12 is adjusted by the projection lens 15, and light of a predetermined light distribution pattern is emitted from the lamp fitting 10 toward the front of the vehicle 100 via the front cover 18.

The control unit CO includes, for example, an integrated circuit such as a microcontroller, an integrated circuit (IC), a large-scale integrated circuit (LSI), or an application specific integrated circuit (ASIC), or a numerical control (NC) device. In addition, when the NC device is used, the control unit CO may use a machine learning device or may not use a machine learning device. As described below, the control unit CO controls the pair of lamp fittings 10.

A light switch 35 included in the vehicle 100 is connected to the control unit CO. The light switch 35 of the present embodiment is a switch that selects emission or non-emission of light. For example, the light switch 35 outputs a signal indicating emission of light to the control unit CO when the light switch 35 is on, and does not output a signal to the control unit CO when the light switch 35 is off.

The detection device 20 detects another vehicle located in front of the vehicle 100. In the present embodiment, when detecting another vehicle, the detection device 20 outputs a signal indicating detection of the other vehicle to the control unit CO via the determination unit 25. In addition, the detection device 20 also detects the state of the detected other vehicle, and outputs a signal indicating the state of the other vehicle to the control unit CO via the determination unit 25. Note that the detection device 20 may directly output these signals to the control unit CO. Examples of the state of the other vehicle include a position of the other vehicle with respect to the vehicle 100, whether the other vehicle is a preceding vehicle or an oncoming vehicle, a distance from the vehicle 100 to the other vehicle, and the like. The detection device 20 includes, for example, a camera, a detection unit, and the like, which are not illustrated. The camera is attached to the front portion of the vehicle 100 and captures an image of the front of the vehicle 100 at predetermined time intervals, for example, ¹/₃₀ second intervals. The captured image captured by the camera includes at least a part of a region irradiated with light emitted from the pair of lamp fittings 10. The detection unit detects the other vehicle located in front of the vehicle 100 and detects the state of the other vehicle from the captured image captured by the camera.

For example, the detection unit detects the presence of an oncoming vehicle and the position of the oncoming vehicle with respect to the vehicle 100 on the basis of light emitted from the headlamps of the oncoming vehicle, and detects the presence of a preceding vehicle and the position of the preceding vehicle with respect to the vehicle 100 on the basis of light emitted from the taillights of the preceding vehicle. Specifically, when there is a pair of white light spots located at a predetermined interval in the left-right direction and having luminance higher than predetermined luminance in the captured image, the detection unit outputs a signal indicating detection of another vehicle and a signal indicating that the other vehicle is an oncoming vehicle to the determination unit 25, assuming that the pair of white light spots correspond to light from the headlamps of the oncoming vehicle. Note that the detection unit may output a signal indicating that the other vehicle is an oncoming vehicle assuming that the signal indicating that the other vehicle is an oncoming vehicle includes detection of the other vehicle. In addition, the detection unit calculates, for example, the distance from the vehicle 100 to the oncoming vehicle on the basis of the positions of the pair of white light spots in the captured image, the distance between the pair of white light spots, and the like. Then, the detection unit outputs, to the determination unit 25, a signal indicating the positions of the pair of white light spots in the captured image as information of the position of the oncoming vehicle with respect to the vehicle 100, and a signal indicating the calculated distance from the vehicle 100 to the oncoming vehicle. In addition, when there is a pair of red light spots located at a predetermined interval in the left-right direction and having luminance higher than predetermined luminance in the captured image, the detection unit outputs a signal indicating detection of another vehicle and a signal indicating that the other vehicle is a preceding vehicle to the determination unit 25, assuming that the pair of red light spots correspond to light from the taillights of the preceding vehicle. Note that the detection unit may output a signal indicating that the other vehicle is a preceding vehicle assuming that the signal indicating that the other vehicle is a preceding vehicle includes detection of the other vehicle. In addition, the detection unit calculates, for example, the distance from the vehicle 100 to the preceding vehicle on the basis of the positions of the pair of red light spots, the distance between the pair of red light spots, and the like. Then, the detection unit outputs, to the determination unit 25, a signal indicating the positions of the pair of red light spots in the captured image as information of the position of the preceding vehicle with respect to the vehicle 100, and a signal indicating the calculated distance from the vehicle 100 to the preceding vehicle. In addition, the detection unit does not output a signal in a case where there is no pair of light spots located at a predetermined interval in the left-right direction and having luminance higher than predetermined luminance in the captured image. Examples of the configuration of the detection unit include a configuration similar to that of the control unit CO, and examples of the camera include a charged coupled device (CCD) camera.

Note that the configuration of the detection device 20, the method of detecting another vehicle with the detection device 20, the method of calculating the distance from the vehicle 100 to another vehicle, and the method of identifying an oncoming vehicle and a preceding vehicle are not particularly limited. For example, the detection device 20 may perform image processing on the captured image captured by the camera, and determine whether the aforementioned pair of light spots is present in the captured image captured by the camera on the basis of information obtained by the image processing. In addition, the detection device 20 may further include a millimeter-wave radar, a LiDAR, or the like capable of detecting an object located in front of the vehicle 100, and may detect another vehicle located in front of the vehicle 100 and detect the state of the other vehicle on the basis of the captured image captured by the camera and a signal input from the millimeter-wave radar, the LiDAR, or the like.

The determination unit 25 determines whether the detected other vehicle satisfies a predetermined requirement on the basis of a signal indicating the state of the other vehicle from detection device 20 that detects the other vehicle located in front of the vehicle 100. Examples of the predetermined requirement include that the distance between another vehicle and the vehicle 100 is less than a predetermined distance, headlamps of an oncoming vehicle are turned on, and taillights of a preceding vehicle are turned on, and at least two of these requirements are satisfied. The predetermined requirement of the present embodiment is that the distance between another vehicle and the vehicle 100 is less than a predetermined distance, and the predetermined distance is, for example, 100 m. Note that the predetermined distance may be different between a case where the other vehicle is a preceding vehicle and a case where the other vehicle is an oncoming vehicle. When the other vehicle satisfies the predetermined requirement and the signal indicating that the other vehicle is a preceding vehicle is input from the detection device 20, the determination unit 25 of the present embodiment outputs, to the control unit CO, a signal indicating that the other vehicle is a preceding vehicle, and a signal indicating the distance from the vehicle 100 to the preceding vehicle and the positions of the pair of red light spots in the captured image as information of the position of the preceding vehicle with respect to the vehicle 100 as signals indicating the state of the other vehicle. In addition, when the other vehicle satisfies the predetermined requirement and the signal indicating that the other vehicle is an oncoming vehicle is input from the detection device 20, the determination unit 25 outputs, to the control unit CO, a signal indicating that the other vehicle is an oncoming vehicle, and a signal indicating the distance from the vehicle 100 to the oncoming vehicle and the positions of the pair of white light spots in the captured image as information of the position of the oncoming vehicle with respect to the vehicle 100 as signals indicating the state of the other vehicle. In addition, when the other vehicle does not satisfy the predetermined requirement and when no signal is input from the detection device 20 to the determination unit 25, the determination unit 25 does not output a signal to the control unit CO. Therefore, the determination by the determination unit 25 can be understood as changing the signal to be output by cases according to the signal input from the detection device 20 as described above.

One power supply circuit 30 corresponds to one lamp fitting 10, and the other power supply circuit 30 corresponds to the other lamp fitting 10. Each power supply circuit 30 adjusts power supplied from a power supply, which is not illustrated, to each light emitting element 13 in the light distribution pattern forming unit 12 of the lamp fitting 10 on the basis of a signal input from the control unit CO, and adjusts the intensity of light emitted from each light emitting element 13. Note that the power supply circuit 30 may adjust the power supplied to each light emitting element 13 by pulse width modulation (PWM) control. In this case, the intensity of light emitted from each light emitting element 13 is adjusted by adjusting the duty cycle.

The memory ME is, for example, a non-transitory recording medium, and is preferably a semiconductor recording medium such as random access memory (RAM) or read only memory (ROM), but may include a recording medium of any format such as an optical recording medium or a magnetic recording medium. Note that the "non-transitory" recording medium includes all computer-readable recording media except for a transitory propagating signal, and does not exclude a volatile recording medium. The memory ME stores a table in which information regarding the light distribution pattern formed by light emitted from the lamp fitting 10 and information of the other vehicle detected by the detection device 20 are associated with each other. Examples of the information regarding the light distribution pattern formed by the light emitted from the lamp fitting 10 in the table include the power supplied to each light emitting element 13 in the light distribution pattern forming unit 12 of the lamp fitting 10. In addition, examples of the information of the other vehicle detected by the detection device 20 in the table include information as to whether the other vehicle is a preceding vehicle or an oncoming vehicle, and information of the distance from the vehicle 100 to the other vehicle and the positions of the pair of light spots in the captured image as information of the position of the other vehicle with respect to the vehicle 100. In addition, the memory ME also stores information regarding power supplied to each light emitting element 13 when a high beam light distribution pattern is formed by the light emitted from the lamp fitting 10.

Figure 4:
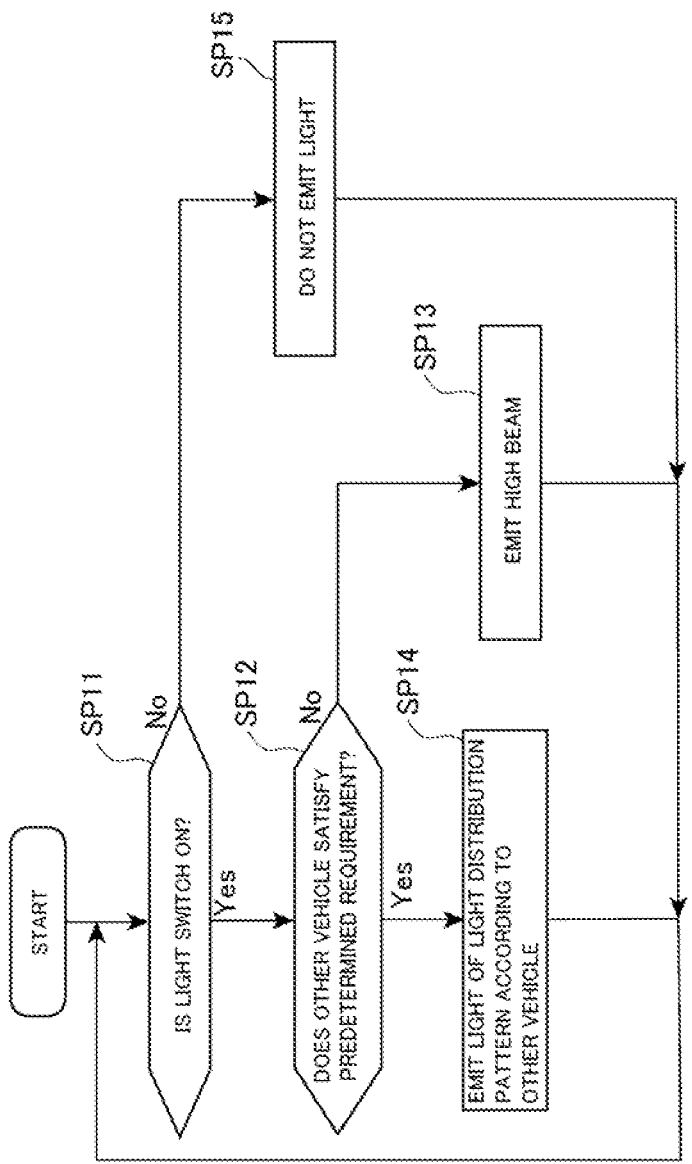
FIG. 4 is a diagram illustrating an example of a control flowchart of a control unit in the present embodiment.

Next, the operation of the vehicle headlamp 1 of the present embodiment will be described. Specifically, an operation of changing the light distribution pattern of emitted light according to another vehicle detected by the detection device 20 will be described. FIG. 4 is a diagram illustrating an example of a control flowchart of the control unit CO in the present embodiment. As illustrated in FIG. 4, the control flow of the present embodiment includes Steps SP11 to SP15.

(Step SP11)

First, the control unit CO determines whether a signal indicating emission of light is input from the light switch 35. When this signal is input to the control unit CO, the control unit CO advances the control flow to Step SP12. On the other hand, when this signal is not input to the control unit CO, the control unit CO advances the control flow to Step SP15. Therefore, the determination of the control unit CO can be understood as changing the step to which the control flow is advanced by cases according to the input signal.

(Step SP12)

In the present step, the control unit CO determines whether another vehicle is detected by the detection device 20 and the other vehicle satisfies the predetermined requirement on the basis of the signal input from the determination unit 25. As described above, when detecting another vehicle, the detection device 20 outputs a signal indicating detection of the other vehicle to the control unit CO via the determination unit 25. In addition, when the other vehicle detected by the detection device 20 satisfies the predetermined requirement, the determination unit 25 outputs a signal indicating the state of the other vehicle to the control unit CO. Therefore, when the signal indicating the detection of the other vehicle and the signal indicating the state of the other vehicle are input from the determination unit 25, the control unit CO determines that the other vehicle satisfies the predetermined requirement, and advances the control flow to Step SP14. Note that, in this case, a signal indicating the distance from the vehicle 100 to the other vehicle and the positions of the pair of light spots in the captured image as information of the position of the other vehicle with respect to the vehicle 100 is also input to the control unit CO.

On the other hand, when the signal indicating the state of the other vehicle is not input from the determination unit 25, the control unit CO determines that the other vehicle does not satisfy the predetermined requirement, and advances the control flow to Step SP13. Note that when no other vehicle is detected by the detection device 20, the signal indicating the state of the other vehicle is not input to the determination unit 25, and the signal indicating the detection of the other vehicle is not input to the control unit CO. Therefore, also in such a case, the control flow proceeds to Step SP13.

(Step SP13)

In the present step, the control unit CO controls the lamp fitting 10 such that a high beam is emitted from the vehicle headlamp 1. Specifically, the control unit CO refers to information stored in the memory ME, and outputs a signal based on the power supplied to each light emitting element 13 in the high beam light distribution pattern to the power supply circuit 30. The power supply circuit 30 supplies power from a power supply, which is not illustrated, to each light emitting element 13 on the basis of this signal. Therefore, the high beam is emitted from the vehicle headlamp 1. Then, the control unit CO returns the control flow to Step SP11.

Figure 5:
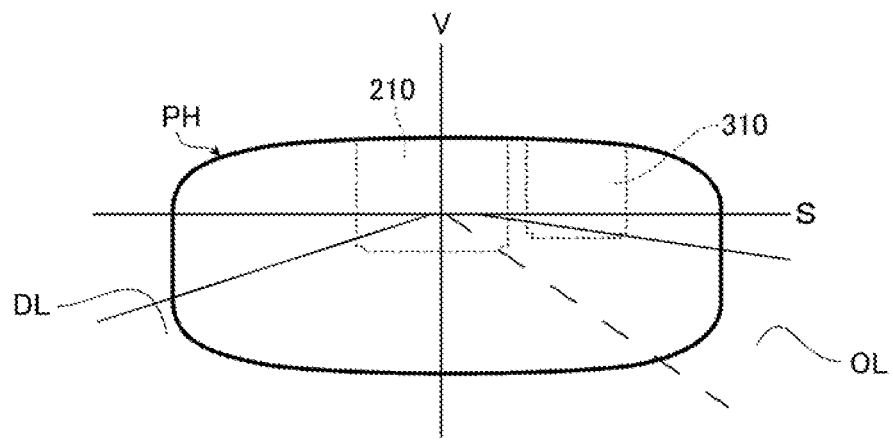
FIG. 5 is a diagram illustrating a high beam light distribution pattern.

FIG. 5 is a diagram illustrating a high beam light distribution pattern. In FIG. 5, S represents a horizontal line, V represents a vertical line passing through the center of the vehicle 100 in the left-right direction, and a high beam light distribution pattern PH formed on a virtual vertical screen arranged 25 m ahead of the vehicle 100 is indicated by the thick line. In the present embodiment, as illustrated in FIG. 5, an oncoming lane OL is located on the right side of a driving lane DL of the vehicle 100, and the vehicle 100 travels on the left side. The hot zone, which is a region having the highest light intensity in the high beam light distribution pattern PH, is located on or near the intersection of the horizontal line S and the vertical line V. The intensity of light in the high beam light distribution pattern PH decreases as it goes away from the hot zone. Note that, in FIG. 5, predetermined regions 210 and 310 to be described below are indicated by the dotted lines.

(Step SP14)

In the present step, the control unit CO controls the lamp fitting 10 such that the light distribution pattern of the light emitted from the vehicle headlamp 1 becomes a light distribution pattern corresponding to the other vehicle detected by the detection device 20. Specifically, the control unit CO refers to the table stored in the memory ME on the basis of the signal indicating whether the other vehicle is a preceding vehicle or an oncoming vehicle, which is a signal indicating the state of the other vehicle input from the determination unit 25, and the signal indicating the distance from the vehicle 100 to the preceding vehicle and the positions of the pair of light spots in the captured image. Then, the control unit CO outputs the signal based on the power supplied to each light emitting element 13 in the light distribution pattern according to the above information regarding the other vehicle to the power supply circuit 30. On the basis of this signal, the power supply circuit 30 supplies power from the power supply to each light emitting element 13, and light of a light distribution pattern corresponding to the above information regarding the other vehicle is emitted from the vehicle headlamp 1. Then, the control unit CO returns the control flow to Step SP11.

Figure 6:
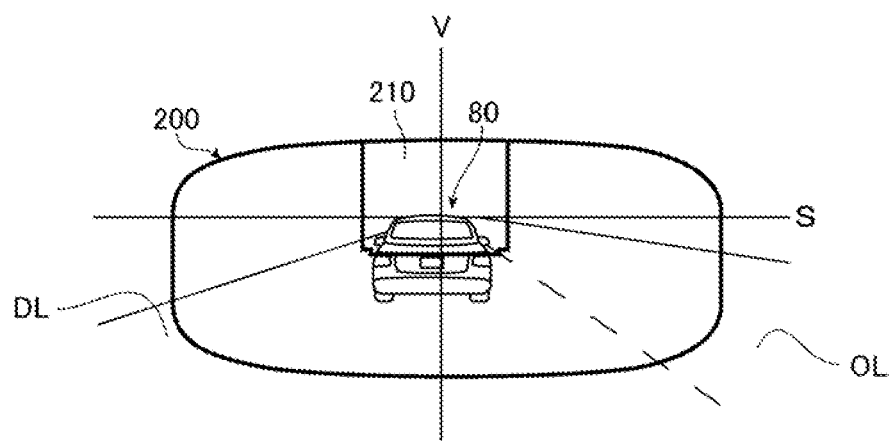
FIG. 6 is a diagram illustrating an example of a light distribution pattern of light emitted when a preceding vehicle is detected by a detection device.

FIG. 6 is a diagram illustrating an example of a light distribution pattern of light emitted when a preceding vehicle is detected by the detection device 20. In FIG. 6, S represents a horizontal line, V represents a vertical line passing through the center of the vehicle 100 in the left-right direction, and a light distribution pattern 200 formed on a virtual vertical screen arranged 25 m ahead of the vehicle 100 is indicated by the thick line. In the present embodiment, the light distribution pattern 200 is a light distribution pattern in which the intensity of light in the predetermined region 210 in the high beam light distribution pattern PH is reduced. Therefore, the total luminous flux amount of the light emitted from the lamp fitting 10 to the predetermined region 210 in the light distribution pattern 200 is smaller than that in the predetermined region 210 in the high beam light distribution pattern PH. In addition, in the predetermined region 210 in the light distribution pattern 200, the intensity of light is substantially constant and lower than the predetermined intensity. In addition, the intensity distribution of light in a region other than the predetermined region 210 in the light distribution pattern 200 is substantially the same as the intensity distribution of light in a region other than the predetermined region 210 in the high beam light distribution pattern PH. Therefore, the region other than the predetermined region 210 in the light distribution pattern 200 can be understood as a region in which the total luminous flux amount of the light from the lamp fitting 10 is not reduced.

Figure 7:
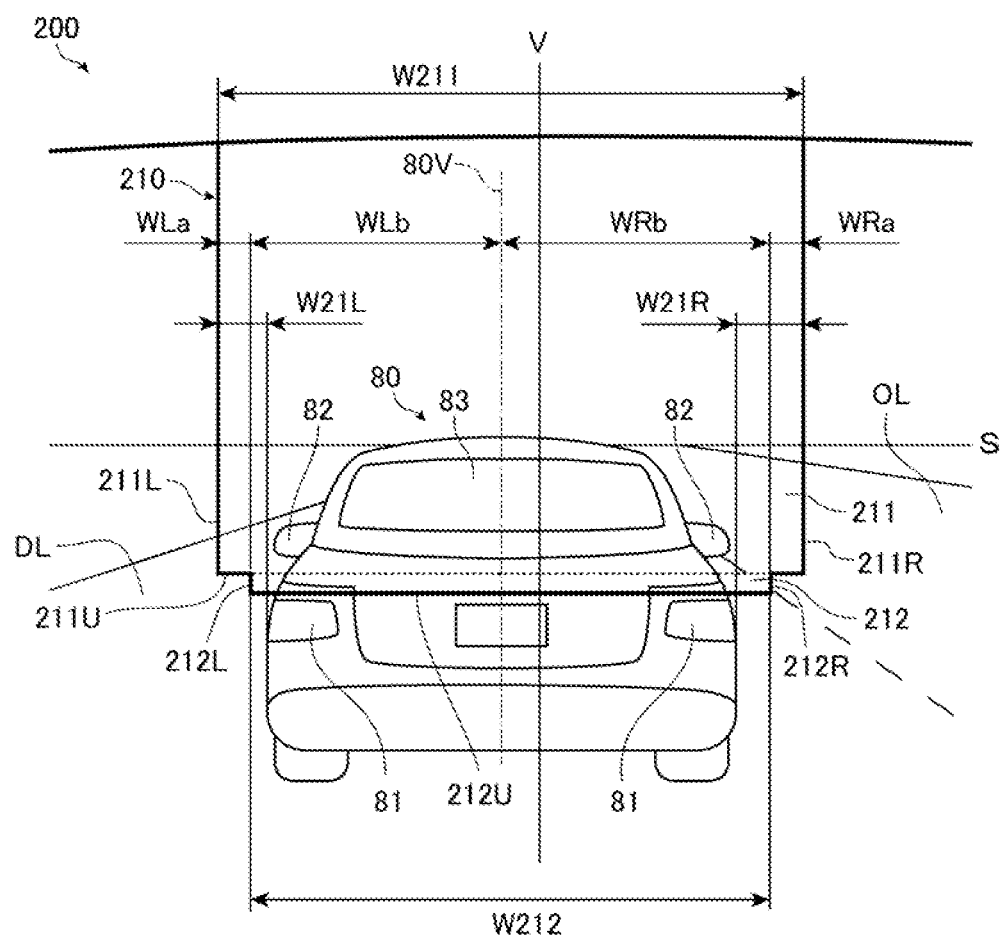
FIG. 7 is an enlarged diagram illustrating a portion including a predetermined region in the light distribution pattern illustrated in FIG. 6.

FIG. 7 is an enlarged diagram illustrating a portion including the predetermined region 210 in the light distribution pattern 200 illustrated in FIG. 6. As illustrated in FIG. 7, the predetermined region 210 crosses a part of a preceding vehicle 80 detected by the detection device 20 in the left-right direction. The predetermined region 210 overlaps a portion above taillights 81 of the preceding vehicle 80. In the present embodiment, the predetermined region 210 includes a first region 211 and a second region 212. Note that, in FIG. 7, a boundary between the first region 211 and the second region 212 is indicated by the dotted line. In addition, a vertical line 80V passing through the center of the preceding vehicle 80 in the left-right direction is indicated by the alternate long and short dash line. The first region 211 crosses a part of the preceding vehicle 80 in the left-right direction. The first region 211 overlaps a whole of side mirrors 82 and a whole of a rear window 83. Note that the side mirrors 82 and the rear window 83 are visual recognition units with which the driver of the preceding vehicle 80 visually recognizes the rear, which is the outside of the vehicle. A lower edge 211U of the first region 211 extends linearly substantially in the left-right direction. The second region 212 is connected to the lower edge 211U of the first region 211, extends in a band shape in the left-right direction, and is located at the lowermost position in the predetermined region 210. A lower edge 212U of the second region 212 extends linearly substantially in the left-right direction. A right edge 212R, which is one edge in the left-right direction in the second region 212, is located on the preceding vehicle 80 side with respect to a right edge 211R of the first region 211. A left edge 212L, which is the other edge in the left-right direction in the second region 212, is located on the preceding vehicle 80 side with respect to a left edge 211L of the first region 211. Therefore, a width W211 of the first region 211 in the left-right direction is larger than a width W212 of the second region 212 in the left-right direction. In addition, a width W21L from the left edge 211L of the first region 211 to the preceding vehicle 80 is smaller than a width W21R from the right edge 212R of the first region 211 to the preceding vehicle 80. Note that the widths W21L and W21R may be substantially the same, and the width W21L may be larger than the width W21R.

In addition, a width WLa from the left edge 211L of the first region 211 to the left edge 212L of the second region 212 and a width WRa from the right edge 211R of the first region 211 to the right edge 212R of the second region 212 are substantially the same. In addition, a width WLb from the left edge 212L of the second region 212 to the vertical line 80V is smaller than a width WRb from the right edge 212R of the second region 212 to the vertical line 80V. Note that the width WLa may be larger than the width WRa, and the width WLa may be smaller than the width WRa. In addition, the width WLb may be larger than the width WRb, and the width WLb and the width WRb may be substantially the same. In addition, the edges 212R and 212L of the second region 212 on both sides in the left-right direction do not overlap the preceding vehicle 80, and the second region 212 crosses the preceding vehicle 80.

In the present embodiment, the width W211 of the first region 211 and the width W212 of the second region 212 change according to the distance from the vehicle 100 to the preceding vehicle 80, and these widths W211 and W212 decrease as the distance from the vehicle 100 to the preceding vehicle 80 increases. In addition, the positions of the first region 211 and the second region 212 integrally change according to the position of the preceding vehicle 80 with respect to the vehicle 100. In the present embodiment, a table stored in the memory ME is configured such that such a light distribution pattern 200 is formed.

Note that depending on the type of the preceding vehicle 80, the positions of the side mirrors 82 and the rear window 83 with which the driver in the vehicle body visually recognizes the rear, which is the outside of the vehicle, vary. However, in general, these visual recognition units for visual recognition of the rear are located in a region above the taillights 81 of the preceding vehicle 80, and a gap is formed in the up-down direction between the taillights 81 and the visual recognition units for visual recognition of the rear. As described above, the detection device 20 detects the positions of the taillights 81 of the preceding vehicle 80. Therefore, even when the visual recognition units of the preceding vehicle 80 for visual recognition of the rear are not detected, the light distribution pattern 200 as described above can be formed by storing in the memory ME in advance information regarding the power supplied to each light emitting element 13 for forming the light distribution pattern 200 having the predetermined region 210 corresponding to the positions of the taillights 81 of the preceding vehicle 80.

Figure 8:
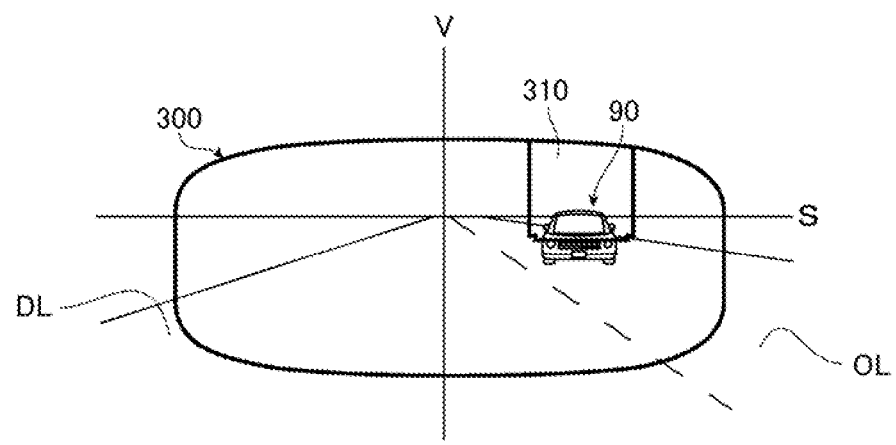
FIG. 8 is a diagram illustrating an example of a light distribution pattern of light emitted when an oncoming vehicle is detected by a detection device.

FIG. 8 is a diagram illustrating an example of a light distribution pattern of light emitted when an oncoming vehicle is detected by the detection device 20. In FIG. 8, S represents a horizontal line, V represents a vertical line passing through the center of the vehicle 100 in the left-right direction, and a light distribution pattern 300 formed on a virtual vertical screen arranged 25 m ahead of the vehicle 100 is indicated by the thick line. In the present embodiment, the light distribution pattern 300 is a light distribution pattern in which the intensity of light in the predetermined region 310 in the high beam light distribution pattern PH is reduced. Therefore, the total luminous flux amount of the light emitted from the lamp fitting 10 to the predetermined region 310 in the light distribution pattern 300 is smaller than that in the predetermined region 310 in the high beam light distribution pattern PH. In addition, in the predetermined region 310 in the light distribution pattern 300, the intensity of light is substantially constant and lower than the predetermined intensity. In addition, the intensity distribution of light in a region other than the predetermined region 310 in the light distribution pattern 300 is substantially the same as the intensity distribution of light in a region other than the predetermined region 310 in the high beam light distribution pattern PH. Therefore, the region other than the predetermined region 310 in the light distribution pattern 300 can be understood as a region in which the total luminous flux amount of the light from the lamp fitting 10 is not reduced.

Figure 9:
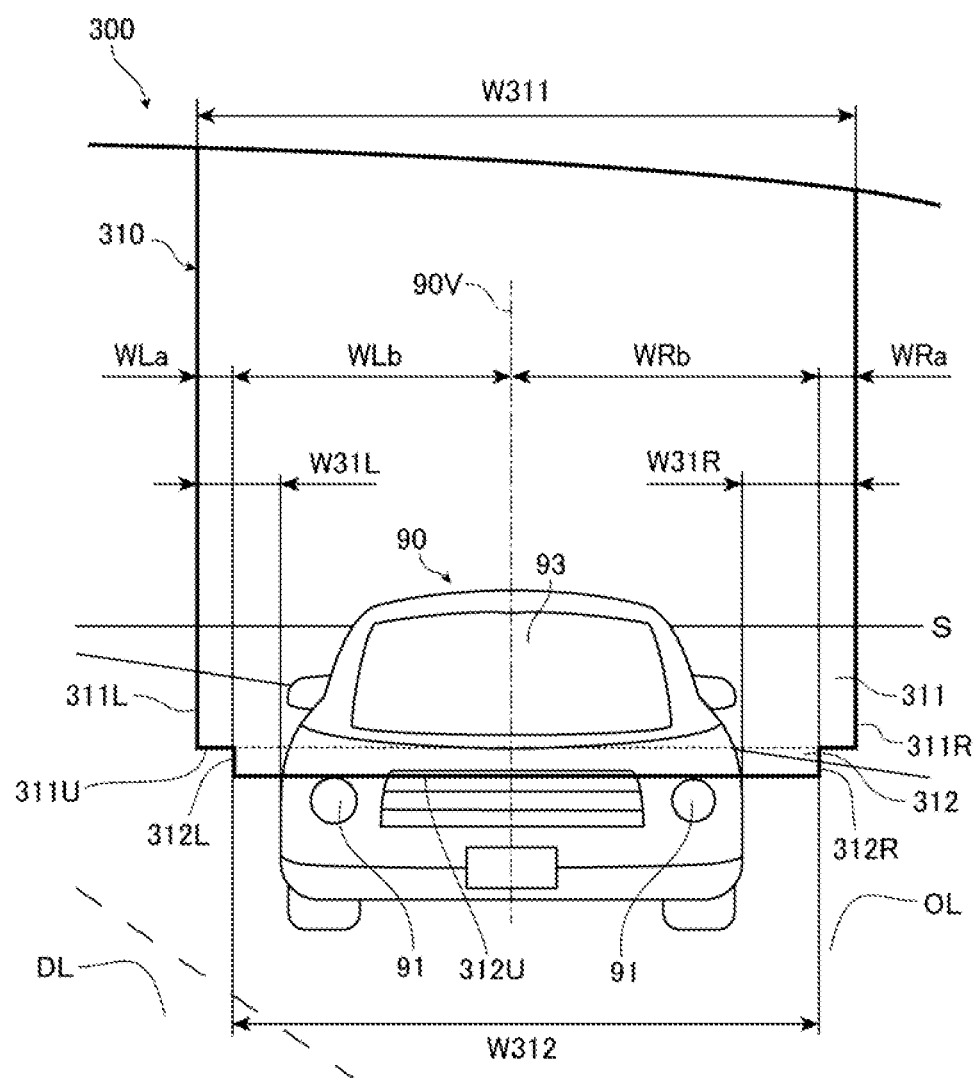
FIG. 9 is an enlarged diagram illustrating a portion including a predetermined region in the light distribution pattern illustrated in FIG. 8.

FIG. 9 is an enlarged diagram illustrating a portion including the predetermined region 310 in the light distribution pattern 300 illustrated in FIG. 8. As illustrated in FIG. 9, the predetermined region 310 crosses in the left-right direction a part of an oncoming vehicle 90 detected by the detection device 20, and a portion of the oncoming vehicle 90 above headlamps 91 overlaps the predetermined region 310. In the present embodiment, the predetermined region 310 includes a first region 311 and a second region 312, similarly to the predetermined region 210 in the case where the preceding vehicle 80 is detected. Note that, in FIG. 8, a boundary between the first region 311 and the second region 312 is indicated by the dotted line. In addition, a vertical line 90V passing through the center of the oncoming vehicle 90 in the left-right direction is indicated by the alternate long and short dash line. The first region 311 crosses a part of the oncoming vehicle 90 in the left-right direction. The first region 311 overlaps a whole of the front window 93, which is a visual recognition unit for the driver of the oncoming vehicle 90 to visually recognizes the front, which is the outside of the vehicle. A lower edge 311U of the first region 311 extends linearly substantially in the left-right direction. The second region 312 is connected to a lower side of the first region 311, extends in a band shape in the left-right direction, and is located at the lowermost position in the predetermined region 310. A lower edge 312U of the second region 312 extends linearly substantially in the left-right direction. The right edge 312R of the second region 312 is located on the oncoming vehicle 90 side with respect to a right edge 311R of the first region 311, and a left edge 312L of the second region 312 is located on the oncoming vehicle 90 side with respect to a left edge 311L of the first region 311. Therefore, a width W311 of the first region 311 in the left-right direction is larger than a width W312 of the second region 312 in the left-right direction. In addition, a width W31R from the right edge 311R of the first region 311 to the oncoming vehicle 90 is larger than a width W31L from the left edge 311L of the first region 311 to the oncoming vehicle 90. Note that the widths W31L and W31R may be substantially the same, and the width W31R may be smaller than the width W31L.

In addition, a width WLa from the left edge 311L of the first region 311 to the left edge 312L of the second region 312 and a width WRa from the right edge 311R of the first region 311 to the right edge 312R of the second region 312 are substantially the same. In addition, a width WLb from the left edge 312L of the second region 312 to the vertical line 90V is smaller than a width WRb from the right edge 312R of the second region 312 to the vertical line 80V. Note that the width WLa may be larger than the width WRa, and the width WLa may be smaller than the width WRa. In addition, the width WLb may be larger than the width WRb, and the width WLb and the width WRb may be substantially the same. In addition, the edges 312R and 312L of the second region 312 on both sides in the left-right direction do not overlap the oncoming vehicle 90, and the second region 312 crosses the oncoming vehicle 90.

In the present embodiment, the width W311 of the first region 311 and the width W312 of the second region 312 change according to the distance from the vehicle 100 to the oncoming vehicle 90 detected by the detection device 20, and these widths W311 and W312 decrease as the distance from the vehicle 100 to the oncoming vehicle 90 increases. In addition, the positions of the first region 311 and the second region 312 integrally change according to the direction of the oncoming vehicle 90 with respect to the vehicle 100, and the widths W311 and W312 thereof change. In the present embodiment, a table stored in the memory ME is configured such that such a light distribution pattern 300 is formed. Note that the width W31R from the right edge 311R of the first region 311 to the oncoming vehicle 90 may be increased as the distance from the vehicle 100 to the oncoming vehicle 90 is shorter.

Note that depending on the type of the oncoming vehicle 90, the position of the front window 93 with which the driver in the vehicle body visually recognizes the front, which is the outside of the vehicle, varies. However, in general, the visual recognition unit for visual recognition of the front is located in a region above the headlamps 91 of the oncoming vehicle 90, and a gap is formed in the up-down direction between the headlamps 91 and the visual recognition unit for visual recognition of the front. As described above, the detection device 20 detects the positions of the headlamps 91 of the oncoming vehicle 90. Therefore, even when the visual recognition unit of the oncoming vehicle 90 for visual recognition of the front is not detected, the light distribution pattern 300 as described above can be formed by storing in the memory ME in advance information regarding the power supplied to each light emitting element 13 for forming the light distribution pattern 300 having the predetermined region 310 corresponding to the positions of the headlamps 91 of the oncoming vehicle 90.

(Step SP15)

In the present step, no signal is input from the light switch 35 to the control unit CO. Therefore, the light switch 35 is in an off state. The control unit CO outputs a predetermined signal to the power supply circuit 30, causes the power supply circuit 30 to stop the supply of power to each light emitting element 13 to not emit the light from the vehicle headlamp 1, and returns the control flow to Step SP11.

As described above, the light distribution pattern of the light emitted from the vehicle headlamp 1 is changed according to the preceding vehicle 80 or the oncoming vehicle 90 detected by the detection device 20. Note that the control flow of the control unit CO is not particularly limited.

As described above, the vehicle headlamp 1 of the present embodiment includes the lamp fitting 10 and the control unit CO. The lamp fitting 10 can change the light distribution pattern of emitted light. In a case where the signal indicating detection of the other vehicle located in front of the vehicle 100 is input from the detection device 20, the control unit CO controls the lamp fitting 10 such that the total luminous flux amount of the light emitted from the lamp fitting 10 to the first regions 211 and 311 and the second regions 212 and 312 connected to the lower side of the first regions 211 and 311 and extending in the left-right direction crossing a part of the other vehicle in the left-right direction in the high beam light distribution pattern PH is reduced. In addition, the control unit CO controls the lamp fitting 10 such that the widths of the widths W211, W311, W212, and W312 of the first regions 211 and 311 and the second regions 212 and 312 in the left-right direction change according to the position of the other vehicle with respect to the vehicle 100. The first regions 211 and 311 cross a part of the other vehicle in the left-right direction and overlap a whole of the visual recognition units with which the driver of the other vehicle visually recognizes the outside of the vehicle. The edges 212R, 212L, 312R, and 312L of the second regions 212 and 312 on both sides in the left-right direction are located on the center side of the other vehicle with respect to the edges 211R, 211L, 311R, and 311L of the first regions 211 and 311 on both sides in the left-right direction.

In the vehicle headlamp 1 of the present embodiment, the widths W211, W311, W212, and W312 of the first regions 211 and 311 and the second regions 212 and 312 in which the total luminous flux amount of light from the lamp fitting 10 is reduced are changed according to the position of the other vehicle with respect to the vehicle 100. Therefore, with the vehicle headlamp 1 of the present embodiment, it is possible to secure an appropriate gap between the other vehicle and the region where the total luminous flux amount of light from the lamp fitting 10 is not reduced according to the position of the other vehicle with respect to the vehicle 100, and it is possible to suppress dazzling of an occupant of the other vehicle. In addition, in the vehicle headlamp 1 of the present embodiment, the first regions 211 and 311 overlap the whole of the visual recognition units with which the driver of the other vehicle visually recognizes the outside of the vehicle. The widths W212 and W312 in the left-right direction of the second regions 212 and 312 connected to the lower side of the first regions 211 and 311 and extending in the left-right direction are smaller than the widths W211 and W311 in the left-right direction of the first regions 211 and 311. Therefore, with the vehicle headlamp 1 of the present embodiment, as compared with a case where the width in the left-right direction of the region in which the total luminous flux amount of light from the lamp fitting 10 is reduced is the same as the widths W212 and W312 in the left-right direction of the second regions 212 and 312 and is constant in the up-down direction, an appropriate gap can be secured between the visual recognition units of the other vehicle and the region in which the total luminous flux amount of light from the lamp fitting 10 is not reduced by the first regions 211 and 311, and dazzling of an occupant of the other vehicle can be suppressed. In addition, with the vehicle headlamp 1 of the present embodiment, as compared with a case where the width in the left-right direction of the region in which the total luminous flux amount of light from the lamp fitting 10 is reduced is the same as the widths W211 and W311 in the left-right direction of the first regions 211 and 311 and is constant in the up-down direction, a gap between the other vehicle and the region in which the total luminous flux amount of light from the lamp fitting 10 is not reduced can be reduced below the visual recognition units of the other vehicle, and the visibility of the front can be improved.

Note that, from the viewpoint of suppressing the dazzling of the occupant of the other vehicle, the first regions 211 and 311 and the second regions 212 and 312 may not be irradiated with light from the lamp fitting 10. However, from the viewpoint of improving the visibility of the front, the first regions 211 and 311 and the second regions 212 and 312 are preferably irradiated with light from the lamp fitting 10.

In addition, in the vehicle headlamp 1 of the present embodiment, when the other vehicle is the oncoming vehicle 90, as illustrated in FIG. 9, the width W31R from the right edge 311R of the first region 311 to the oncoming vehicle 90 is larger than the width W31L from the left edge 311L of the first region 311 to the oncoming vehicle 90. In the present embodiment, since the vehicle 100 travels on the left side, the right edge 311R of the first region 311 is located on the side opposite to the driving lane DL side of the vehicle 100 in the left-right direction, and the left edge 311L of the first region 311 is located on the driving lane DL side. Then, the gap between the right edge 311R of the first region 311 and the oncoming vehicle 90 is larger than the gap between the left edge 311L of the first region 311 and the oncoming vehicle 90. Here, an angle formed by a traveling direction of the vehicle 100 and a direction from the vehicle 100 toward the oncoming vehicle 90 increases as the oncoming vehicle 90 approaches the vehicle 100, and in a country or a region where the vehicle 100 travels on the left side, the oncoming vehicle 90 moves in the right direction in the field of view of the driver of the vehicle 100. Therefore, with the above configuration, dazzling of the occupant of the oncoming vehicle 90 can be appropriately suppressed as compared with the case where the gap between the left edge 311L of the first region 311 and the oncoming vehicle 90 is the same as the gap between the right edge 311R of the first region 311 and the oncoming vehicle 90.

In addition, the vehicle headlamp 1 of the present embodiment further includes the determination unit 25 that determines whether the other vehicle satisfies the predetermined requirement on the basis of the information from the detection device 20. The predetermined requirement is that the distance between the other vehicle and the vehicle 100 is less than the predetermined distance, and the control unit CO controls the lamp fitting 10 as described above in a case where the determination unit 25 determines that the other vehicle satisfies the predetermined requirement. When the distance between the other vehicle and the vehicle 100 increases, dazzling of the occupant of the other vehicle tends to be less likely to occur. Therefore, with the vehicle headlamp 1 of the present embodiment, it is possible to suppress a change in the high beam light distribution pattern PH when dazzling of the occupant of the other vehicle is unlikely to occur. Note that the control unit CO may control the lamp fitting 10 as described above when the signal indicating detection of the other vehicle is input from the detection device 20 regardless of the determination of the determination unit 25, and the vehicle headlamp 1 may not include the determination unit 25. In this case, for example, when detecting the other vehicle, the detection device 20 directly outputs the signal indicating detection of the other vehicle and the signal indicating the state of the other vehicle to the control unit CO.

Note that, unlike the present embodiment, in a country or a region where the vehicle travels on the left side, the oncoming lane OL is located on the left side of the driving lane DL of the vehicle 100. Therefore, in such a case, when the width W31L from the left edge 311L of the first region 311 to the oncoming vehicle 90 is larger than the width W31R of the right edge 311R of the first region 311 to the oncoming vehicle 90, dazzling of the occupant of the oncoming vehicle 90 can be appropriately suppressed. That is, when the width from the edge on the side opposite to the driving lane DL side in the left-right direction in the first region 311 to the oncoming vehicle 90 is larger than the width from the edge on the driving lane DL side in the left-right direction in the first region 311 to the oncoming vehicle 90, the dazzling of the occupant of the oncoming vehicle 90 can be appropriately suppressed.

In addition, in the vehicle headlamp 1 of the present embodiment, when the other vehicle is the preceding vehicle 80, as illustrated in FIG. 7, the width W21L from the left edge 211L of the first region 211 to the preceding vehicle 80 is smaller than the width W21R from the right edge 211R of the first region 211 to the preceding vehicle 80. In the present embodiment, since the vehicle 100 travels on the left side, the left edge 211L of the first region 211 is located on the side opposite to the oncoming lane OL side, and the right edge 211R of the first region 211 is located on the oncoming lane OL side. Then, the gap between the left edge 211L of the first region 211 and the preceding vehicle 80 is smaller than the gap between the right edge 211R of the first region 211 and the preceding vehicle 80. Therefore, as compared with a case where the gap between the left edge 211L of the first region 211 and the preceding vehicle 80 is the same as the gap between the right edge 211R of the first region 211 and the preceding vehicle 80, the visibility of the region on the left side of the preceding vehicle 80 can be improved, and the visibility of a sign or the like provided on the sidewalk or the like can be improved.

Note that, unlike the present embodiment, in a country or a region where the vehicle travels on the right side, the oncoming lane OL is located on the left side of the driving lane DL of the vehicle 100. Therefore, in such a case, when the width W21R from the right edge 211R of the first region 211 to the preceding vehicle 80 is smaller than the width W21L from the left edge 211L of the first region 211 and the preceding vehicle 80, the visibility of the region on the right side of the preceding vehicle 80 can be improved, and the visibility of a sign or the like provided on the sidewalk or the like can be improved. That is, when the width from the edge on the side opposite to the oncoming lane OL side in the left-right direction in the first region 211 to the preceding vehicle 80 is smaller than the width from the edge on the oncoming lane OL side in the left-right direction in the first region 211 to the preceding vehicle 80, the visibility of the region on the side opposite to the oncoming lane OL side from the preceding vehicle 80 can be improved, and the visibility of a sign or the like provided on the sidewalk or the like can be improved.

In addition, in the vehicle headlamp 1 of the present embodiment, when the other vehicle is the preceding vehicle 80, as illustrated in FIG. 7, the width WLb from the left edge 212L of the second region 212 to the vertical line 80V passing through the center of the preceding vehicle 80 is smaller than the width WRb from the right edge 212R of the second region 212 to the vertical line 80V. In the present embodiment, the vehicle 100 travels on the left side. Therefore, the width WLb from the edge 212L on the side opposite to the oncoming lane OL side in the left-right direction in the second region 312 to the vertical line 80V is smaller than the width WRb from the edge 212R on the oncoming lane OL side in the left-right direction in the second region 312 to the vertical line 80V. Therefore, for example, the visibility of the region on the side opposite to the oncoming lane OL side from the preceding vehicle 80 can be improved, and a pedestrian, a two-wheeled vehicle, and the like located on the side opposite to the oncoming lane OL side of the preceding vehicle 80 can be easily visually recognized. Note that, from this viewpoint, the width W21L is preferably smaller than the width W21R as described above. In addition, unlike the present embodiment, in a country or a region where the vehicle travels on the right side, the visibility of the region on the side opposite to the oncoming lane OL side from the preceding vehicle 80 can be improved by making the width WLb smaller than the width WLb.

In addition, in the vehicle headlamp 1 of the present embodiment, when the other vehicle is the oncoming vehicle 90, as illustrated in FIG. 9, the width WLb from the left edge 312L of the second region 312 to the vertical line 90V passing through the center of the oncoming vehicle 90 is smaller than the width WRb from the right edge 312R of the second region 312 to the vertical line 90V. In the present embodiment, the vehicle 100 travels on the left side. Therefore, the width WLb from the edge 212L on the driving lane DL side in the left-right direction in the second region 312 to the vertical line 80V is smaller than the width WLa from the edge 312R on the side opposite to the driving lane DL side in the left-right direction in the second region 312 to the vertical line 80V. Therefore, for example, the visibility of the region on the driving lane DL side from the oncoming vehicle 90 can be improved, and the difficulty in passing the oncoming vehicle 90 can be suppressed. Note that, from this viewpoint, the width W31R is preferably larger than the width W31L, that is, the width W31L is preferably smaller than the width W31R as described above. In addition, unlike the present embodiment, in a country or a region where the vehicle travels on the right side, the visibility of the region on the driving lane DL side from the oncoming vehicle 90 can be improved by making the width WLa smaller than the width WLb.

In addition, in the vehicle headlamp 1 of the present embodiment, as illustrated in FIGS. 7 and 9, the widths WLa from the left edges 211L and 311L of the first regions 211 and 311 to the left edges 212L and 312L of the second regions 212 and 312 and the widths WRa from the right edges 211R and 311R of the first regions 211 and 311 to the right edges 212R and 312R of the second regions 212 and 312 are substantially the same. Therefore, it is possible to suppress that the driver feels a sense of discomfort about the light distribution patterns 200 and 300 as compared with the case where the widths WLa and the widths WRa are different.

In addition, in the vehicle headlamp 1 of the present embodiment, as illustrated in FIGS. 7 and 9, the entire visual recognition units of the other vehicle and the second regions 212 and 312 overlap in the up-down direction. Therefore, for example, as compared with a case where the second regions 212 and 312 do not overlap even at least a part of the visual recognition units of the other vehicle in the up-down direction, even when the vehicle 100 vibrates up and down or the other vehicle vibrates up and down, a region other than the first regions 211 and 311 and the second regions 212 and 312 in the light distribution patterns 200 and 300 and the visual recognition units of the other vehicle may be less likely to overlap. Therefore, dazzling of the occupant of the other vehicle can be more appropriately suppressed.

Although the present invention has been described above by taking the aforementioned embodiments as an example, the present invention is not limited thereto.

For example, in the above embodiment, the vehicle headlamp that changes the high beam light distribution pattern PH according to the other vehicle detected by the detection device 20 has been described as an example. However, it is sufficient if the vehicle headlamp changes the light distribution pattern of emitted light according to the other vehicle detected by the detection device 20. For example, the vehicle headlamp may change a low beam light distribution pattern according to the other vehicle detected by the detection device 20.

In addition, in the above embodiment, the lamp fitting 10 including the light distribution pattern forming unit 12, which is a so-called LED array, has been described as an example. However, it is sufficient if the lamp fitting 10 can change the light distribution pattern of emitted light, and is not particularly limited. For example, the configuration of the lamp fitting 10 may be a configuration in which light emitted from a light source is scanned using a reflector such as a rotating reflecting plate, a micro electro mechanical system (MEMS), or a galvanometer mirror to form a predetermined light distribution pattern. In this case, the light distribution pattern of emitted light can be changed by adjusting the inclination of the reflector or adjusting the light emitted from the light source. In addition, the configuration of the lamp fitting 10 may be a configuration in which light emitted from a light source is diffracted using liquid crystal on silicon (LCOS) to form a predetermined light distribution pattern. In this case, the light distribution pattern of emitted light can be changed by adjusting the orientation of the liquid crystal in the LCOS.

In addition, in the above embodiment, the light distribution patterns 200 and 300 in which the intensity distribution of light in a region other than the predetermined regions 210 and 310 is substantially the same as the intensity distribution of light in a region other than the predetermined regions 210 and 310 in the high beam light distribution pattern PH have been described as an example. However, the intensity distribution of light in the region other than the predetermined regions 210 and 310 in the light distribution patterns 200 and 300 changed according to the other vehicle detected by the detection device 20 may be different from the intensity distribution of light in the region other than the predetermined regions 210 and 310 in the light distribution pattern before changed according to the other vehicle. However, from the viewpoint of suppressing the driver of the vehicle 100 from feeling a sense of discomfort, it is preferable that the intensity distribution of light in the region other than the predetermined regions 210 and 310 does not substantially change according to the other vehicle detected by the detection device 20.

In addition, in the above embodiment, when the other vehicle is the preceding vehicle 80, the width from the edge on the side opposite to the oncoming lane OL side in the left-right direction in the first region 211 to the preceding vehicle 80 is made smaller than the width from the edge on the oncoming lane OL side in the left-right direction in the first region 211 to the preceding vehicle 80. However, the width from the edge on the oncoming lane OL side in the left-right direction in the first region 211 to the preceding vehicle 80 may be smaller than the width from the edge on the side opposite to the oncoming lane OL side in the left-right direction in the first region 211 to the preceding vehicle 80. In this case, for example, in a country or a region where the vehicle travels on the left side as in the present embodiment, the gap between the right edge 211R of the first region 211 and the preceding vehicle 80 as viewed from the driver of the vehicle 100 is smaller than the gap between the left edge 211L of the first region 211 and the preceding vehicle 80. Therefore, as compared with a case where the gap between the right edge 211R of the first region 211 and the preceding vehicle 80 is the same as the gap between the left edge 211L of the first region 211 and the preceding vehicle 80, the visibility of the region on the right side of the preceding vehicle 80 can be improved. Therefore, with such a vehicle headlamp, for example, a pedestrian or the like in the vicinity of the center line or in the vicinity of a lane boundary line on the oncoming lane side can be easily visually recognized.

In addition, in the above embodiment, the second regions 212 and 312 in which the edges 212R, 212L, 312R, and 312L on both sides in the left-right direction do not overlap the preceding vehicle 80 or the oncoming vehicle 90, which is another vehicle, have been described as an example. However, at least a part of the right edges 212R and 312R of the second regions 212 and 312 may overlap the preceding vehicle 80 or the oncoming vehicle 90, and at least a part of the left edges 212L and 312L of the second regions 212 and 312 may overlap the preceding vehicle 80 or the oncoming vehicle 90. With such a configuration, it is possible to increase the light amount emitted to the preceding vehicle 80 or the oncoming vehicle 90 while suppressing dazzling of the occupant of the preceding vehicle 80 or the oncoming vehicle 90, and it is possible to improve the visibility of the preceding vehicle 80 or the oncoming vehicle 90.

In addition, in the above embodiment, the predetermined regions 210 and 310 crossing a part of the preceding vehicle 80 or the oncoming vehicle 90, which is another vehicle, in the left-right direction have been described as an example. However, it is sufficient if the predetermined regions 210 and 310 cross at least a part of the other vehicle located in front of the vehicle in the left-right direction, and the predetermined regions 210 and 310 may cross a whole of the other vehicle in the left-right direction. In addition, the entire circumference of the predetermined regions 210 and 310 may be surrounded by a region other than the predetermined regions 210 and 310 in the light distribution patterns 200 and 300. In addition, the intensity of light in the predetermined regions 210 and 310 may change according to the distance from the vehicle 100 to the preceding vehicle 80 or the distance from the vehicle 100 to the oncoming vehicle 90. In addition, the intensity of light in the predetermined region 210 of the light distribution pattern 200 and the intensity of light in the predetermined region 310 of the light distribution pattern 300 may be different from or the same as each other. In addition, it is sufficient if the first regions 211 and 311 cross at least a part of the other vehicle in the left-right direction and overlap the entire visual recognition units with which the driver of the other vehicle visually recognizes the outside of the vehicle. The first regions 211 and 311 may cross a whole of the other vehicle in the left-right direction. In addition, the widths W211 and W311 of the first regions 211 and 311 in the left-right direction and the widths W212 and W312 of the second regions 212 and 312 in the left-right direction may not be constant in the up-down direction. In this case, for example, the sizes of the above widths W211, W311, W212, W312, W21L, W21R, W31L, W31R, WLa, WLb, WRa, and WRb are the minimum width sizes.

In addition, in the above embodiment, the detection device 20 that detects the preceding vehicle 80 on the basis of the light from the taillights 81 of the preceding vehicle 80 and detects the oncoming vehicle 90 on the basis of the light from the headlamps 91 of the oncoming vehicle 90 has been described as an example. However, the detection device 20 may detect the side mirrors 82, the rear window 83, and the like as the visual recognition units in the preceding vehicle 80, and detect the front window 93 as the visual recognition unit in the oncoming vehicle 90. In this case, the control unit CO may control the pair of lamp fittings 10 on the basis of the information of the visual recognition unit detected by the detection device 20.

According to the present invention, a vehicle headlamp capable of improving the visibility of the front while suppressing dazzling of an occupant of another vehicle is provided, and can be used in the field of vehicle headlamps of automobiles or the like.

The invention claimed is:

1. A vehicle headlamp comprising:
a lamp fitting configured to be capable of changing a light distribution pattern of emitted light; and
a control unit configured to, when a signal indicating detection of another vehicle located in front of a vehicle is input from a detection device, control the lamp fitting such that a total luminous flux amount of light emitted from the lamp fitting to a first region that crosses at least a part of the other vehicle in a left-right direction and a second region that is connected to a lower side of the first region and extends in the left-right direction in the light distribution pattern decreases, and widths in the left-right direction in the first region and the second region change according to a position of the other vehicle with respect to the vehicle,
wherein
the first region overlaps a whole of a visual recognition unit with which a driver of the other vehicle visually recognizes outside of the vehicle, and
edges of the second region on both sides in the left-right direction are located on a center side of the other vehicle with respect to edges of the first region on both sides in the left-right direction.

2. The vehicle headlamp according to claim 1, wherein when the other vehicle is an oncoming vehicle, a width from an edge on a side opposite to a driving lane side of the vehicle in the left-right direction in the first region to the other vehicle is larger than a width from an edge on the driving lane side of the vehicle in the left-right direction in the first region to the other vehicle.

3. The vehicle headlamp according to claim 1, wherein when the other vehicle is a preceding vehicle, a width from an edge on an oncoming lane side in the left-right direction in the first region to the other vehicle is smaller than a width from an edge on a side opposite to the oncoming lane side in the left-right direction in the first region to the other vehicle.

4. The vehicle headlamp according to claim 1, wherein when the other vehicle is a preceding vehicle, a width from an edge on a side opposite to an oncoming lane side in the left-right direction in the first region to the other vehicle is smaller than a width from an edge on the oncoming lane side in the left-right direction in the first region to the other vehicle.

* * * * *